United States Patent Office 3,305,549
Patented Feb. 21, 1967

3,305,549
PRODUCTION OF SUBSTITUTED BIURETS
Francis L. Chubb, Pierrefonds, Quebec, Canada, assignor to Frank W. Horner Limited, Mount Royal, Quebec, Canada, a company of Canada
No Drawing. Filed June 2, 1966, Ser. No. 554,676
6 Claims. (Cl. 260—247.2)

This invention relates to a process for the production of substituted biurets. More particularly, this invention relates to a process for producing substituted biurets substantially free of undesirable side reaction products and in high yields.

The present application is a continuation-in-part application of U.S. Serial No. 438,389, filed March 9, 1965, now abandoned.

The standard method of preparing biurets having one or two substituents on the same terminal nitrogen is by the reaction of nitrobiuret with the appropriate primary or secondary amine. Such reaction, however, has limited usefulness when the biuret one wishes to prepare has substituents on both terminal nitrogen due to the difficulty in preparing and purifying the apropriate nitro precursor. For example, the reaction of nitrated 1-methylbiuret with phenethylamine has been found to yield a mixture of 1-phenethylbiuret and 1-phenethyl-5-methylbiuret, showing that the nitration of 1-methylbiuret gives a mixture of the 1- and 5-nitro derivatives rather than the desired 5-nitro derivative alone.

In addition, it has been found that prior art methods used for the production of unsubstituted biuret are not equally suitable for the production of substituted biurets.

Accordingly, one or more of the following objects will be achieved by the practice of this invention.

It is an object of the invention to provide a novel process for the preparation of substituted biurets. It is another object of the invention to provide a novel process which is equally suitable for preparing biurets having substituents on one or both terminal nitrogen atoms. It is a further object of the invention to provide a novel process for preparing substituted biurets substantially free of undesirable side reaction products and in high yields. These and other obejcts will become apparent to one skilled in the art in the light of the instant specification.

In its broad aspect, the present invention is directed to a process which comprises contacting an allophanyl azide of the formula:

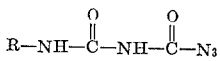

wherein R is selected from the group consisting of hydrogen, alkyl and aralkyl, with an amine selected from the group consisting of primary and secondary amines; in an inert normally-liquid substantially non-polar organic medium; at an elevated temperature and for a period of time sufficient to produce a substituted biuret. Said process is characterized by the following reaction scheme, wherein R is as hereinbefore defined, $R_1$ is selected from the group consisting of hydrogen, alkyl and aralkyl, $R_2$ is selected from the group consisting of alkyl and aralkyl, and $R_1$ and $R_2$ can be taken together with N to form a heterocyclic radical:

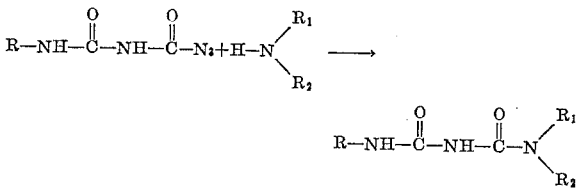

The allophanyl azides employed as reactants in the process of the invention can be conveniently prepared from the corresponding N-substituted or unsubstituted allophanic acid ester, produced by the procedure of German Patent No. 427,417. The allophanic acid ester is first converted to the hydrazide by hydrazinolysis and then to the azide by diazotization. The reactions of the latter type have been described by Audrieth and Gordon in J. Org. Chem., 20, 244 (1955).

By way of illustration, N-n-butylallophanylazide, a reactant useful in the practice of the invention, can be prepared by reacting ethyl N-n-butyl allophanate, produced by the condensation of ethyl carbonate and N-n-butylurea in the presence of sodium ethoxide, with hydrazine and then diazotizing the resulting hydrazide in a cold hydrochloric acid-sodium nitrite aqueous medium.

The novelty and unobviousnes of the process of the present invention can be emphasized by an analysis of the prior art. Lipschitz, J.A.C.S., 66, 658 (1944) prepared unsubstituted biuret in high yields by the reaction of allophanyl azide and ammonia in an aqueous reaction medium.

It has been found that, if allophanyl azide or a substituted allophanyl azide is reacted with a primary or secondary amine in an aqueous reaction medium following the teachings of Lipschitz, the reaction yields are generally unsatisfactory. It has unexpectedly been found, however, that, if allophanyl azide or a substituted allophanyl azide is reacted with a primary or secondary amine in an inert normally liquid substantially non-polar organic medium the substituted biuret product is obtained in high yields.

Such finding is particularly unobvious and unexpected in the light of the teachings of Lipschitz since, if the reference reactants, i.e., allophanyl azide and ammonia, are reacted in an inert normally-liquid substantially non-polar organic medium, such as benzene, no increase in yield is obtained. In fact, yields tend to be somewhat lower than when the reaction is carried out in an aqueous medium.

Illustrative allophanyl azides useful in the practice of the invention include, for example, allophanyl azide; N-alkyl allophanyl azides, such as N-methyl allophanyl azide, N-ethyl allophanyl azide, N-propyl allophanyl azide, N-n-butyl allophanyl azide, N-sec-butyl allophanyl azide, N-n-pentyl allophanyl azide, and the like; and N-aralkyl allophanyl azides, such as N-benzyl allophanyl azide, N-α-phenethyl allophanyl azide, N-β-phenethyl allophanyl azide, N-β-phenylpropyl allophanyl azide, N-γ-phenylpropyl allophanyl azide, N-δ-phenylbutyl allophanyl azide, and the like.

The amine reactants operable in the process of the present invention are amines which have at least one hydrogen atom attached to the amino nitrogen, namely, primary and secondary amines.

Illustrative primary amines useful in the present process include alkylamines such as, for example, methylamine, ethylamine, propylamine, isopropylamine, n-butylamine, t-butylamine, and the like; arylamines such as, for example, aniline, p-chloroaniline, and the like; and aralkylamines such as, for example, benzylamine, phenethylamine, phenylpropylamine, and the like.

The secondary amines useful in the practice of the invention can be aliphatic or cyclic. The aliphatic secondary amines can be symmetrical or unsymmetrical and include, for example, dialkylamines, such as dimethylamine, diethylamine, dipropylamine, di-n-butylamine, methylethylamine, methylbutylamine, and the like; di-aralkylamines, such as dibenzylamine, diphenethylamine, diphenylpropylamine, benzylphenethylamine, and the like; and alkylaralkylamines such as methylbenzylamine, and the like.

The cyclic secondary amines contemplated by the present invention contain a secondary amino nitrogen as part of a heterocyclic ring. Such ring can additionally contain other hetero atoms such as oxygen, sulfur or other nitrogens. Illustrative compounds include, for example, piperidine, morpholine, pyrrolidine, and the like.

As indicated above, the novel process is carried out in an inert normally-liquid substantially non-polar organic medium. Illustrative of the said media are, for example, saturated aliphatic hydrocarbons such as heptane, hexane, petroleum ether, and the like; and aromatic hydrocarbons, such as benzene, toluene, xylene, and the like. It has been found that, when the present process is carried out in an aromatic or saturated aliphatic hydrocarbon medium, the yields obtained are unexpectedly and surprisingly higher not only than when the reaction is carried out in an aqueous medium but also when a polar organic medium is used. For example, when the reaction of allophanyl azide and ethylamine is carried out in a benzene medium, there is obtained a yield of 90 percent of theoretical. On the other hand, when the same reaction is carried out in a methanol medium, the yield is only 58 percent.

The ratio of allophanyl azide to amine reactant is not narrowly critical and can vary over a wide range. Preferably, for the sake of economy and efficiency, equimolar amounts of each reactant are used.

The present reaction can be carried out over a wide temperature range. Depending upon various factors such as the nature of the reaction medium, the nature of the particular reactants, and the like, the reaction temperature may be as low as 20° C. and as high as 120° C. A reaction temperature in the range of from about 70° C. to about 90° C. is preferred.

In general, the reaction is conducted for a period of time sufficient to obtain the desired substituted biuret product and such time will vary according to the operative temperature, the nature of the reaction medium, and other factors. It has been observed that desirable results can be obtained by conducting the reaction for a period of time ranging from about 15 minutes to 5 hours. At a reaction temperature of about 80° C., a heating period of about 30 minutes to about one hour is usually sufficient for the reaction to proceed to completion.

The order of addition of the reactants of the present process does not appear to be critical. A suitable procedure consists of dissolving the amine reactant in an appropriate normally-liquid reaction medium and to slowly add thereto the allophanyl azide reactant. Once the addition is complete, the reaction mixture is first stirred at room temperature and then heated to the desired elevated temperature and maintained at said elevated temperature until the reaction is substantially completed.

The resulting product can be recovered from the reaction product mixture by conventional techniques, i.e., as a residue upon evaporation of the liquid reaction medium. If desired, the crude product can be recrystallized by conventional means.

The products which are obtained in accordance with the present invention have useful pharmaceutical properties. For example, a general group of novel compounds which can be prepared by the present process and which possess depressant properties on the central nervous system of warm-blooded animals are disclosed and claimed in U.S. Serial No. 438,419, by John D. McColl and Francis L. Chubb, filed March 9, 1965.

The following Example A illustrates that unsubstituted biurets can be produced from allophanyl azide and ammonia in substantially similar yields whether the reaction medium is water or an inert normally-liquid substantially non-polar organic compound, such as benzene.

EXAMPLE A.—PREPARATION OF BIURET

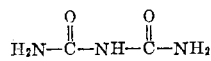

A. *Aqueous medium*

To a 100 ml. three-necked flask, equipped with a mechanical stirrer and containing a solution of 0.1 mol of ammonia in 25 ml. of water, there was added 3.2 grams (0.025 mol) allophanyl azide. The mixture was stirred at room temperature for about five minutes and the flask was then heated on a steam bath until the solution became clear and gas bubbles ceased to evolve therefrom. The product obtained by cooling the solution was recrystallized from 35 ml. of hot water to yield 1.5 grams of biuret hydrate, M.P. 188–191° C. (with decomposition). The mother liquor was freeze-dried and the residue was recrystallized from methanol-chloroform to yield an additional 0.3 gram of biuret hydrate, M.P. 182–185° C. Addition of ether to the mother liquor gave an additional 0.1 gram of impure anhydrous biuret, M.P. 176–180° C.

Total biuret yield: 1.9 grams (63% of the theoretical).

B. *Benzene medium*

To a 100 ml. three-necked flask equipped with a mechanical stirrer and containing 50 ml. of benzene, there was added 3.2 gram (0.025 mol) of allophanyl azide. The mixture was heated on a steam bath and gaseous ammonia was bubbled through the reaction mixture during the entire heating period. After heating for about 45 minutes, the reaction mixture, which had not become clear, was cooled and the resulting precipitate was recovered by filtration and recrystallized from 35 ml. of hot water to yield 2.25 gram of slightly impure biuret hydrate, M.P. 178–182° C. (with decomposition). An additional recrystallization from hot water yielded 1.5 gram of biuret hydrate, M.P. 183–186° C. (with decomposition). Concentration of the mother liquor gave an additional 0.2 gram of product, M.P. 186–188° C. (with decomposition).

Total biuret yield: 1.7 gram (56% of theoretical).

The following examples are illustrative of the present invention. In addition, the examples illustrate the unobvious and unexpected advantages obtained when inert normally-liquid substantially non-polar organic compounds are used as the reaction media instead of water.

EXAMPLE I.—PREPARATION OF 1-β-PHENETHYLBIURET

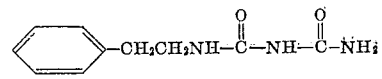

A. To a solution of 3.8 gram (0.031 mol) of β-phenethylamine in 150 ml. of benzene, there was slowly added 4.0 gram (0.031 mol) of allophanyl azide. The mixture was stirred for about one hour at room temperature and then slowly warmed to reflux and maintained at the reflux temperature for about 30 minutes. The reaction mixture was then cooled to about 15° C. and the resulting precipitate collected by filtration. There was obtained 6.2 gram (97% of theoretical) of 1-phenethylbiuret, M.P. 136–138° C.

B. In an analogous manner as above, when heptane or toluene are used as the reaction medium instead of benzene, the yields of 1-phenethylbiuret are respectively 86% and 76% of theoretical.

C. To 50 ml. of water there was added 3.8 gram (0.031 mol) of β-phenethylamine. To the mixture, there was then slowly added 4 gram (0.031 mol) of allophanyl azide. During the addition, the reaction mixture was stirred and slowly warmed to a temperature of about 86° C. The addition required a period of about two hours, at which time solution of the reactants in the reaction medium was almost complete. Approximately 20 ml. of water was added to the reaction during the addition of the allophanyl azide.

The reaction mixture was allowed to stand overnight and the resulting precipitate was collected by filtration and washed with about 75 ml. of water. There was obtained 2.95 grams (46% of theoretical) of 1-phenethyl biuret.

EXAMPLE II.—PREPARATION OF 1-β-PHENETHYL-5-n-BUTYLBIURET

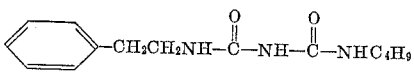

A. To a solution of 2.6 grams (0.022 mol) of β-phenethylamine in 150 ml. of benzene, there was added 4.0 gram (0.022 mol) of N-n-butylallophanyl azide. The mixture was stirred at room temperature for about one hour and then slowly warmed to a temperature of about 78° C., where it was maintained for a period of about one hour. When the benzene was removed by evaporation, there was obtained 5.3 grams (93% of theoretical) of crude product, M.P. 76–89° C.

Recrystallization from ethanol-water yielded 2.75 grams, M.P. 91–92° C., 1.45 grams, M.P. 90° C., and 0.5 gram, M.P. 89–91° C. The total amount of purified product was 4.7 grams (82% of theoretical).

*Analysis.*—Calculated for $C_{14}H_{21}N_3O_2$: C, 63.86; H, 8.04; N, 15.96. Found: C, 63.65; H, 8.26; N, 15.93.

B. To a solution of 2.6 grams (0.022 mol) of β-phenethylamine in 150 ml. of water, there was added 4.0 grams (0.022) mol) of N-n-butylallophanyl azide. The mixture was stirred for about 75 minutes at room temperature and then warmed to about 96° C. and maintained at said temperature for about 30 minutes. The reaction mixture was cooled and extracted with two 150 ml. portions of ether. The combined ether extracts were dried over sodium sulfate and concentrated by evaporation of the ether solvent. There was obtained an oily residue, which crystallized on standing. Recrystallization from ethanol-water yielded 1.95 grams of 1-β-phenethyl-5-n-butylbiuret, M.P. 92–94° C. Concentration of the mother liquor yielded an additional 0.4 gram of product, M.P. 89–91° C. The total yield was 2.35 grams (41% of theoretical).

EXAMPLE III.—PREPARATION OF N-(4-β-PHENETHYLALLOPHANYL)MORPHOLINE

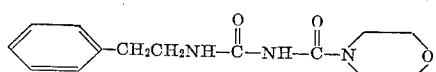

To a solution of 1.5 grams (0.017 mol) of morpholine in 156 ml. of benzene, there was added an equimolar amount (4.0 grams) of N-β-phenethylallophanyl azide. The mixture was stirred for about one hour at room temperature and then slowly warmed to a temperature of about 79° C., where it was maintained for about 30 minutes. When the benzene was then removed by evaporation, there was obtained 4.4 grams (93% of theoretical), of crude product.

Recrystallization from methanol yielded 3.1 grams, M.P. 135–136° C., and 0.5 gram, M.P. 128–130° C., a total of 3.6 grams (77% of theoretical) of purified product.

*Analysis.*—Calculated for $C_{14}H_{19}N_4O_3$: C, 60.63; H, 6.91; N, 15.15. Found: C, 60.77; H, 6.87; N, 15.13.

EXAMPLE IV.—PREPARATION OF 1-n-BUTYL-5,5-DIETHYLBIURET

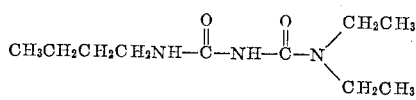

A. To a solution of 1.7 gram (0.023 mol) of diethylamine in 150 ml. of benzene, there was added 4.0 gram (0.022 mol) of N-n-butylallophanyl azide. The mixture was stirred for one hour at room temperature and then heated to a temperature of about 79° C., where it was maintained for about 30 minutes. After cooling to room temperature the benzene was removed under reduced pressure leaving an oily residue. Recrystallization from methanol-water yielded 3.2 gram, M.P. 34–36° C., and 0.45 gram, M.P. 34–36° C., and 0.45 gram, M.P. 31–32° C., a total of 3.65 gram (78% of theoretical) of purified material.

*Analysis.*—Calculated for $C_{10}H_{21}N_3O_2$: C, 55.78; H, 9.83. Found: C, 56.02; H, 10.02.

B. A mixture of 2.6 ml. of diethylamine, 4.0 gram (0.022 mol) of N-n-butylallophanyl azide and 150 ml. of water was stirred for one hour at room temperature, and then slowly warmed to about 100° C. and maintained at said temperature for about 20 minutes. After evaporation of the water, the residue was recrystallized from methanol-water to yield 1.1 gram (23% of theoretical) of 1-n-butyl-5,5-diethylbiuret, M.P. 33–34° C.

EXAMPLE V.—PREPARATION OF 1-BENZYL-5-PROPYLBIURET

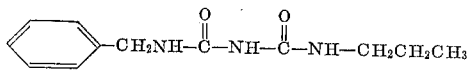

To a solution of 10.7 gram (0.1 mol) of benzylamine in 150 ml. of benzene, there was added 17.1 gram (0.1 mol) of N-propylallophanyl azide. After the reaction mixture was stirred for a period of 30 minutes at room temperature, it was heated to boiling on a steam cone. After cooling and evaporation of the solvent, a gummy residue remained. The residue was dissolved in ethanol-water and the solution treated with activated charcoal. On cooling, there was obtained 20.2 gram (86% of theoretical) of 1-benzyl-5-propylbiuret, M.P. 85–87° C.

*Analysis.*—Calculated for $C_{12}H_{17}N_3O_2$: C, 61.24; H, 7.28; N, 17.85. Found: C, 61.20; H, 7.40; N, 18.26.

EXAMPLE VI.—PREPARATION OF 1,1-DIETHYLBIURET

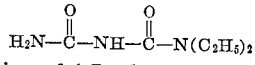

A. To a solution of 1.7 ml. (1.2 gram, 0.016 mol) of diethylamine in 75 ml. of benzene, there was added 2.0 gram (0.0155 mol) of allophanyl azide. After stirring for one hour at room temperature, the mixture was heated to about 78° C. and maintained at such temperature for about 40 minutes. The mixture was then cooled to about 15° C. and the resulting precipitate removed by filtration. There was obtained 1.85 gram of 1,1-diethylbiuret, M.P. 139–141° C. Concentration of the filtrate yielded an additional 0.15 gram of product, M.P. 136–141° C. Total yield was 2.0 gram (80% of theoretical).

B. A mixture of 1.7 ml. of diethylamine, 2.0 gram of allophanyl azide and 75 ml. of water was stirred for two hours at room temperature and then slowly warmed to about 100° C. and maintained at said temperature for about 30 minutes. Removal of the water by evaporation yielded a gummy residue which could not be crystallized from either methanol or benzene.

Although the invention has been illustrated by the preceding examples, the invention is not to be construed as limited to the materials employed in the above examples but rather the invention encompasses the generic area as hereinbefore disclosed. Various modifications and embodiments of this invention can be made without departing from the spirit and scope thereof.

What is claimed is:

1. A process which comprises contacting a compound of the formula:

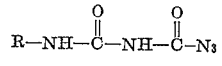

wherein R is selected from the group consisting of hydrogen, alkyl and aralkyl, with an amine having at least one hydrogen atom attached to the amino nitrogen; in an inert normally-liquid substantially non-polar organic medium; at an elevated temperature and for a period of time sufficient to produce a substituted biuret product.

2. The process of claim 1 wherein the temperature is in the range of from about 20° C. to about 120° C.

3. The process of claim 1 wherein the allophanyl azide reactant and the amine reactant are employed in substantially equimolar amounts.

4. A process which comprises contacting an allophanyl azide of the formula:

$$R-NH-\overset{O}{\underset{\|}{C}}-NH-\overset{O}{\underset{\|}{C}}-N_3$$

wherein R is selected from the group consisting of hydrogen, alkyl and aralkyl, with an amine of the formula:

$$H-N\begin{matrix}R_1\\ \\R_2\end{matrix}$$

wherein $R_1$ is selected from the group consisting of hydrogen, alkyl and aralkyl, $R_2$ is selected from the group consisting of alkyl and aralkyl, and $R_1$ and $R_2$ can be taken together with N to form a heterocyclic radical; in an inert normally-liquid substantially non-polar organic medium; at an elevated temperature; and for a period of time sufficient to produce a substituted biuret product.

5. The process of claim 4 wherein the temperature is in the range of from about 20° C. to about 120° C.

6. The process of claim 4 wherein the allophanyl azide reactant and the amine reactants are employed in substantially equimolar amounts.

No references cited.

ALEX MAZEL, *Primary Examiner.*

HENRY R. JILES, *Examiner.*